(12) United States Patent
Yamada

(10) Patent No.: US 7,854,461 B2
(45) Date of Patent: Dec. 21, 2010

(54) SLIDE/FLIP-UP TYPE SEAT FOR AUTOMOBILE

(75) Inventor: Takuro Yamada, Tochigi (JP)

(73) Assignee: TS Tech Co., Ltd., Saitama (JP)

( * ) Notice: Subject to any disclaimer, the term of this patent is extended or adjusted under 35 U.S.C. 154(b) by 59 days.

(21) Appl. No.: 12/301,533

(22) PCT Filed: May 18, 2007

(86) PCT No.: PCT/JP2007/060658
§ 371 (c)(1),
(2), (4) Date: May 4, 2009

(87) PCT Pub. No.: WO2007/136119
PCT Pub. Date: Nov. 29, 2007

(65) Prior Publication Data
US 2009/0322115 A1    Dec. 31, 2009

(30) Foreign Application Priority Data
May 19, 2006   (JP) ............................. 2006-139949

(51) Int. Cl.
*B60N 2/30* (2006.01)
*B60N 2/08* (2006.01)
*B60N 2/20* (2006.01)

(52) U.S. Cl. .............. 296/65.05; 296/65.11; 296/65.13; 296/69; 297/335

(58) Field of Classification Search ................... 296/63, 296/65.01–65.03, 65.05, 65.09, 65.11, 65.13, 296/65.16, 69; 248/424, 425, 429; 297/335, 297/336
See application file for complete search history.

(56) References Cited

U.S. PATENT DOCUMENTS 5,711,505 A * 1/1998 Nemoto ....................... 248/424

(Continued)

FOREIGN PATENT DOCUMENTS

JP    2000085429    3/2000

(Continued)

OTHER PUBLICATIONS

PCT/JP2007/060658, International Search Report; Jul. 17, 2007.

*Primary Examiner*—Patricia L Engle
(74) *Attorney, Agent, or Firm*—Dann, Dorfman, Herrell and Skillman, P.C.

(57) ABSTRACT

A slide/flip-up type automobile-seat is disclosed. The seat is provided with lock-release restricting mechanisms provided at lower rail members of a slide rail mechanism for keeping slide lock levers in unlockable states with respect to the lower rail members during flipping-up movement of an entire seat or in a state where the entire seat has been flipped up, and for keeping striker locks in states of being unallowable to be unlocked when the lock levers are in states of incompletely locked with respect to the lower rail members. Each of the lock-release mechanisms includes a restricting arm which includes an arm body, a rising-up piece rising up from one end portion of the arm body and having a height reaching a position under a rear end portion of corresponding one of the lock levers, and a retaining piece which is provided at a side edge of the arm body and to which a corresponding one of extension rods extending from the striker locks is connected. The restricting arm is pivotally supported to a corresponding lower rail member with the rising-up piece being inserted through an elongated hole formed in the lower rail member, in such a manner that the rising-up piece is moved between the position just under the rear end portion of the lock lever and a position just behind the rear end portion of the lock lever according to forward and rearward strokes of the extension rod when the striker lock is unlocked and locked.

1 Claim, 6 Drawing Sheets

U.S. PATENT DOCUMENTS

| | | | |
|---|---|---|---|
| 6,234,574 B1 * | 5/2001 | Hoshihara et al. | 297/336 |
| 6,773,068 B2 * | 8/2004 | Shinozaki | 297/344.1 |
| 6,994,391 B2 * | 2/2006 | Lutzka et al. | 296/65.03 |
| 2006/0220411 A1 * | 10/2006 | Pathak et al. | 296/65.11 |
| 2006/0249972 A1 * | 11/2006 | Lutzka et al. | 296/65.03 |

FOREIGN PATENT DOCUMENTS

| | | |
|---|---|---|
| JP | 200401772 | 1/2004 |
| JP | 2005053245 | 3/2005 |
| JP | 2006123864 | 5/2006 |

* cited by examiner

SLIDE/FLIP-UP TYPE SEAT FOR AUTOMOBILE

TECHNICAL FIELD

The present invention relates to a slide/flip-up type automobile-seat which is movable in a forward/rearward direction in an automobile body via a slide rail mechanism and is configured such that a seat back of the seat can be folded down onto a seat cushion of the seat and an entire seat comprising the seat cushion and the seat back in the folded-down state on the seat cushion can be flipped up from a rearward direction together with the sliding rail mechanism.

BACKGROUND ART

Referring now to FIGS. 11 and 12, a slide/flip-up type automobile-seat according to a general example will be discussed hereinafter in order to facilitate understanding of the present invention. As shown in FIG. 11, this automobile seat includes a seat cushion 2, a seat back 1 pivotally supported via reclining means (not shown) to the seat cushion 2 so as to be pivotable forward and rearward in such a manner that an angle of the seat back 1 relative to the seat cushion 2 can be adjusted, and a slide rail mechanism 3 for allowing an entire seat to be slid in a forward/rearward direction in an automobile body. The slide rail mechanism includes a pair of spaced apart lower rail members 3b, and a pair of spaced apart upper rail members 3a mounted to lower portions of the seat cushion and supported to the lower rail members 3b so as to be slidable along the lower rail members 3b (only one upper rail member 3a and only one lower rail member 3b are shown in FIG. 11). Thus, the entire seat can be moved along the lower rail members 3b in the forward/rearward direction.

The seat is provided with lock levers (not shown) for causing the upper rail members 3a to be releasably locked with respect to the lower rail members 3b, each of the lock levers being arranged between corresponding one of the upper rail members 3a and corresponding one of the lower rail members 3b so as to extend in the forward/rearward direction, and an operation lever 4 of a substantially U-shape in outline connected at both ends thereof to the lock levers and extending forward of a bottom of the seat cushion 2. When an occupant on the seat pulls the operation lever 4 up, the lock levers are brought to unlocking states or actuated so as to allow the upper rail members 3a to be unlocked relative to the lower rail members 3b. When the operation lever 4 is released from the pulling-up, the operation lever 4 is returned to an original state by spring means and, thus, the lock levers return to locking states or cause the upper rail members 3a to be locked with respect to the lower rail members 3b.

In the automobile seat, especially, a rear seat for a wagon-type car, the entire seat in which the seat back 1 is brought to a folded-down state on the seat cushion 2 is adapted to be flipped up together with the slide rail mechanism 3 from a rearward direction as shown in FIG. 12, in order that a storage space for baggage, luggage, etc. can be obtained.

In the flip-up type automobile-seat, the lower rail members 3b are pivotally supported, via support shafts 6, at forward end portions thereof to spaced apart brackets 5 which are mounted on an automobile body floor F (only one support shaft 6 and only one bracket 5 are shown in FIG. 12). The lower rail members 3b are provided at rearward end portions thereof with striker locks 8 which are adapted to be releasably locked with respect to strikers 7 mounted on the automobile body floor F (only one striker lock 8 and only one striker 7 are shown in FIG. 12). The seat is provided with a traction strap 9 that is coupled to the striker locks 8. When the strap 9 is pulled by the person, whereby the striker locks 8 are actuated in such a manner that they are allowed to be released from the strikers 7, the entire seat is automatically flipped up from the rearward direction due to actions of torque springs (not shown) mounted around the support shafts 6.

It is desirable that the flip-up type automobile-seat is provided with lock-release restricting means for keeping the lock levers in the unlocking states, even if the person erroneously touches the operation lever 4 so as to pull the operation lever 4 up during the flipping-up movement of the entire seat or in the state where the entire seat has been flipped up, and for keeping the striker locks in the locked states with respect to the strikers, even if the strap is drawn so as to cause the striker locks to be released from the strikers in a state where the lock levers are accidentally brought to incompletely locking states (half locking states).

As the lock-release restricting means for the slide/flip-up type automobile-seat, there is proposed a restricting means which is provided at a side of each of a pair of spaced apart lower rail members of a slide rail mechanism (Japanese Patent Application Laid-Open No. 2005-53245).

The restricting means includes a stopper piece pivotally supported at a lower end portion thereof to a side of a lower rail member, the stopper piece having a projecting piece which is projected inward of an upper rail member from an upper end portion of the stopper piece and extends toward a rear end of a corresponding lock lever. The stopper piece is connected to a corresponding striker lock through an extension rod whose end is connected to a substantially middle region of the stopper piece. According to a forward and rearward stroke of the extension rod which is brought about by locking and unlocking operations of the striker lock, the stopper piece is swung in such a manner that the projecting piece is moved between a position just behind the rear end of the lock lever and a position just under the rear end of the lock lever.

In the lock-release restricting means, the stopper piece is provided at the side of the lower rail member, so that in a state where baggage, luggage, etc. are placed in a space under the seat cushion, when the strap is pulled in order that the entire seat is flipped up from the rearward direction, there is a possibility that the stopper piece will strike the baggage, luggage, etc. to thereby prevent expected flipping-up movement of the entire seat.

DISCLOSURE OF THE INVENTION

It is an object of the present invention to provide a slide/flip-up type seat for an automobile, which is provided with lock-release restricting means that allow expected flipping-up movement of an entire seat without allowing restricting arms of the lock-release restricting means to strike luggage, baggage, etc. even if the luggage, baggage, etc. are placed in a space under a seat cushion of the seat, and in which lock levers can be kept in locking states during the flipping-up movement of the entire seat or in a state where the entire seat has been flipped up, even if a person erroneously touches an operation lever so as to pull the operation lever up, and striker locks can be kept in locked conditions with respect to strikers, even if a strap is drawn so as to cause the striker locks to be released from the strikers in a condition where the lock levers are accidentally brought to incompletely locking states (half locking states).

In accordance with the present invention, there is provided an automobile seat which comprises a seat cushion, a seat back pivotally supported to the seat cushion so as to be allowed to be folded down onto the seat cushion, a pair of spaced apart lower rail members pivotally supported, via support shafts, at forward end portions thereof to a pair of spaced apart brackets mounted on an automobile body floor, each of the lower rail members having an elongated hole formed in a bottom portion of a lower rail member so as to longitudinally extend, the lower rail members being provided at rearward end portions thereof with striker locks which are adapted to be releasably locked with strikers mounted on the automobile body floor, extension rods extending from the striker locks, a pair of spaced apart upper rail members attached to lower portions of the seat cushion and slidably supported to the lower rail members, a lock lever pivotally supported to each of the upper rail members and adapted to be locked with respect to the lower rail member to cause an upper rail member to be locked with respect to the lower rail member, an operation lever connected to the lock levers for actuating the lock levers in such a manner that the lock levers cause the upper rail member to be unlocked with respect to the lower rail members, so that an entire seat including the seat back and the seat cushion is allowed to be slid along the lower rail members, springs mounted around the support shafts for causing the entire seat including the seat cushion and the seat back in a state of being folded on the seat cushion to be automatically flipped up about the support shafts from a rearward direction, together with the upper and lower rail member, and lock-release restricting means provided at each of the lower rail members for keeping the lock levers in unlockable states with respect to the lower rail members during flipping-up movement of the entire seat or in a state where the entire seat is flipped up, and for keeping the striker locks in states of being unallowable to be unlocked when the lock levers are in states of incompletely locked with respect to the lower rail members. The lock-release restricting means comprises a support plate attached to an outer surface of the bottom portion of the lower rail member so as to cover the elongated hole, with a predetermined space being provided between the support plate and the outer surface of the bottom portion of the lower rail member and with a region of the support plate being projected laterally from the lower rail member, and a restricting arm including an arm body having first and second end portions, a rising-up piece rising up from the second end portion of the arm body and having a height reaching a position just under a rear end portion of the lock lever when brought to a locked state, and a retaining piece to which corresponding one of the extension rods is connected, the restricting arm being arranged with the arm body being received in the space and pivotally supported at the first end portion thereof to the region of the support plate and with the rising-up piece being inserted through the elongated hole of the lower rail member and projected up to the position just under the rear end portion of the lock lever in the locked state.

In the seat according to the present invention, the support plate covering the elongated hole is attached to the outer surface of the bottom portion of the lower rail member and used as a base for the lock-release restricting means including the restricting arm pivotally supported to the support plate with the rising-up piece being inserted through the elongated hole and projected up to the position just under the rear end portion of the lock lever in the locked state. Therefore, in a case where the striker locks are to be brought to unlocked states with respect to the strikers in order that the entire seat is flipped up, even if any things such as baggage, luggage, etc. are placed in a space under the seat cushion, the restricting arm is prevented from touching the things.

During the flipping-up movement of the entire seat or in the state where the entire seat has been flipped up, the rising-up pieces of the restricting arms are located at the positions just under the rear end portions of the lock levers due to forward movement of the extension rods, so that even if the occupant erroneously touches the operation lever so as to pull the operation lever up, the lock levers are kept in the locked states. Moreover, when unlocking operation of the striker locks with respect to the strikers is tried in a state where the lock levers are incompletely locked, the rising-up pieces of the restricting arms are abutted against rear end edges of the lock levers, so that the striker locks cannot be unlocked with respect to the strikers. At this time, the person can recognize that the lock levers are in the states of being incompletely locked.

BEST MODE FOR CARRYING OUT THE INVENTION

Figure 1:
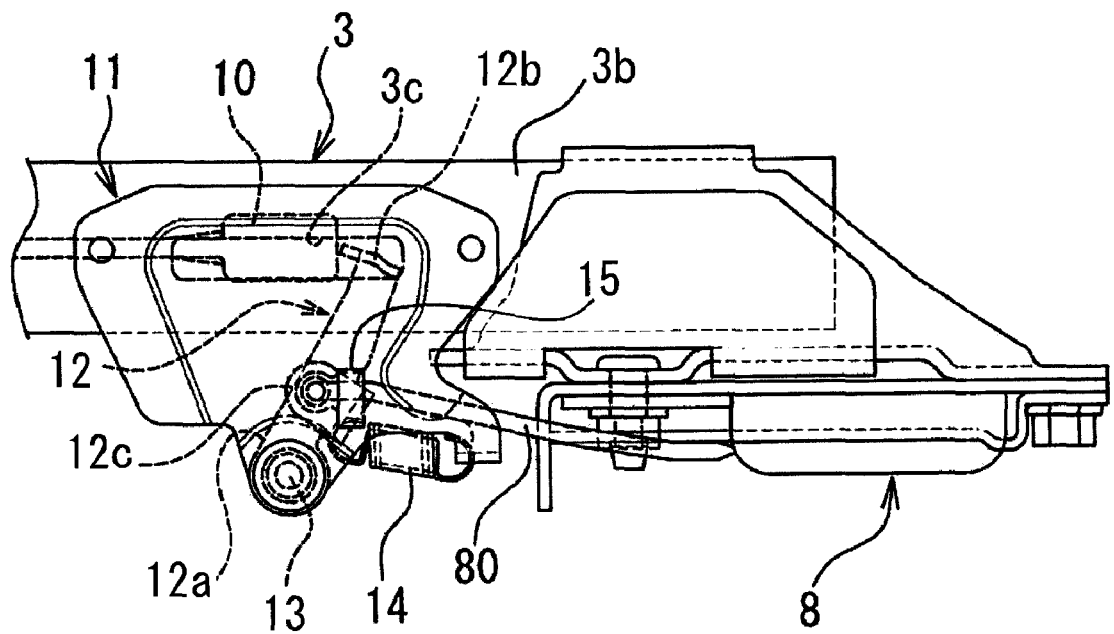
FIG. 1 is a schematic bottom plan view mainly showing lock-release restricting means and a striker lock which are provided in an automobile seat according to the present invention.
Figure 11:
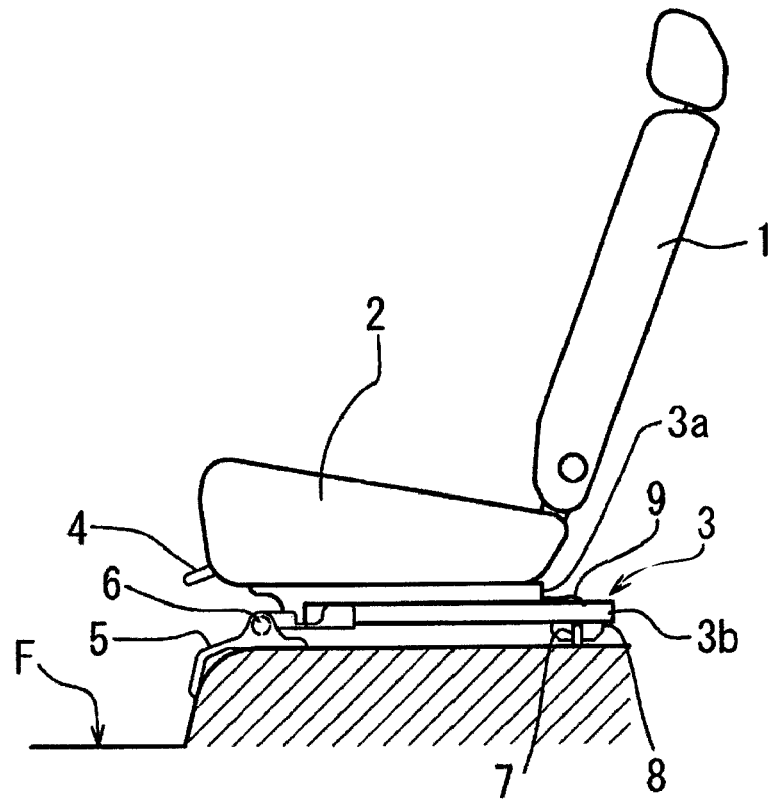
FIG. 11 is a schematic side view showing a slide/flip-up type automobile-seat according to a general example.

An automobile seat according to an embodiment of the present invention will be discussed hereinafter with reference to FIGS. 1 to 10. The automobile seat has the same components as the seat of FIG. 11 does. Such same components are denoted by the like reference numerals and their description will not be repeated hereinafter. In FIG. 1, a reference numeral 3 denotes a slide rail mechanism, a reference numeral 3b designates a pair of spaced apart lower rail members of the slide rail mechanism 3 (only one lower rail member 3b is shown in FIG. 1), and a reference numeral 8 designates a striker lock which is provided at an inner side of a rear end portion of each of the lower rail members 3b. The slide rail mechanism 3 includes a pair of spaced apart upper rail members (not shown) as well as the lower rail members 3b. The upper rail members are mounted to lower portions of a seat cushion (not shown) of the seat and slidably supported to the lower rail members 3b so as to be slidable along the lower rail members 3b. Thus, the seat cushion can be slid along the lower rail members in a forward/rearward direction in an automobile body.

Lock levers 10 are arranged in the slide rail mechanism 3 so as to extend in the forward/rearward direction (only one lock lever 10 is shown in FIG. 1). Each of the lock levers 10 is provided at a rear end portion thereof with a lock piece which has through-holes and is adapted to be releasably engaged, via the through-holes, with projecting teeth which are provided at a flange portion extending inward from a corresponding lower rail member 3b. The lock levers 10 are pivotally supported at substantially middle portions thereof to sides of the upper rail members. The substantially U-shaped operation-lever 4 (see FIGS. 11 and 12) is connected at both end portions thereof to the lock levers 10. When the operation lever 4 is pulled up by an occupant on the seat, the lock levers 10 are pivoted so as to be released from the projecting teeth, whereby the seat cushion is brought to a state of being allowed to be slid along the lower rail members.

Each of the lower rail members 3b has an elongated hole 3c formed in a bottom portion thereof so as to longitudinally extend. The elongated hole 3c is formed in the bottom portion of the lower rail member 3b in such a manner that it extends rearward from a region comprising a region of the bottom portion which positionally corresponds to the lock piece of a corresponding lock lever 10. A support plate 11 is fixedly attached to an outer surface of the bottom portion of each of the lower rail members 3b so as to cover the elongated hole 3c. The support plate 11 serves as a base for lock-release restricting means which will be discussed in detail hereinafter.

Figure 2:
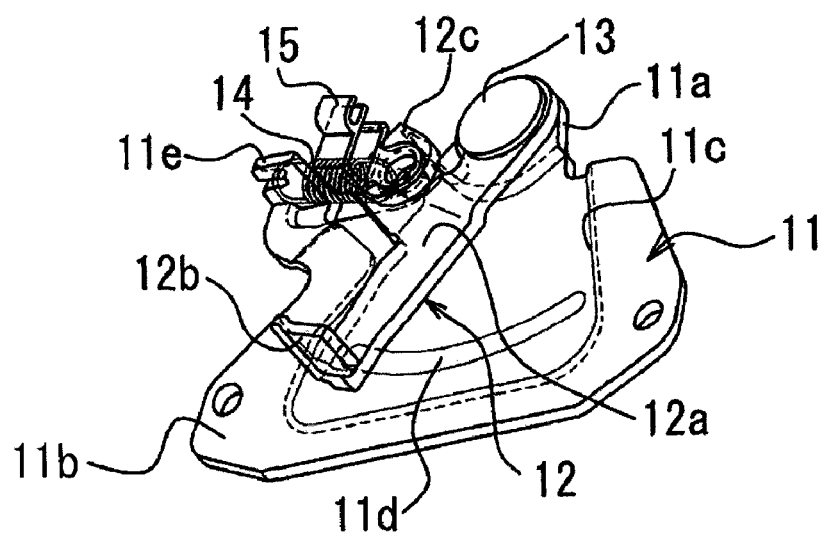
FIG. 2 is a schematic perspective view showing the lock-release restricting means of FIG. 1.
Figure 3:
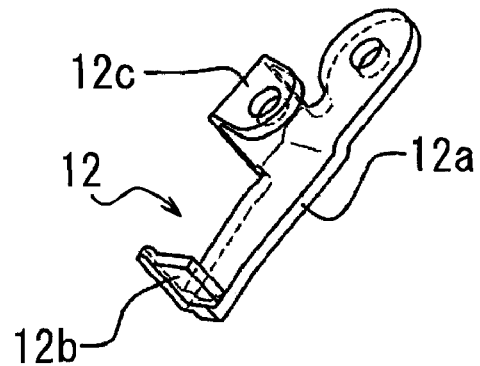
FIG. 3 is a schematic perspective view showing a restricting arm which is one of components of the lock-release restricting means of FIG. 2.

The lock-release restricting means is provided at each of the lower rail members 3b. Referring now to FIGS. 2 and 3, the lock-release restricting means includes a restricting arm 12. The restricting arm 12 includes an arm body 12a pivotally supported at a first end thereof to the support plate 11 by a support pin 13. The arm body 12a has a rising-up piece 12b rising up from a second free end thereof and having a predetermined height, and a retaining piece 12c provided at a side edge of the arm body 12a. An extension rod 80 which extends forward from a corresponding striker lock 8 is connected to the retaining piece 12c (see FIG. 1).

The arm body 12a is step-bent at a substantially middle portion thereof so as to have a high step portion on the side of the first end thereof and a lower step portion on the side of the second free end thereof. The rising-up piece 12b is provided in such a manner that a tip end portion thereof faces the lock piece of the corresponding lock lever 10. The retaining piece 12c is formed in a substantially inverted L-shape so as to rise up from the side edge of the arm body 12a. The extension rod 80 is connected to an upper region of the substantially inverted L-shaped retaining-piece 12c. A tension spring 14 is retained at one end thereof to a vertical region of the retaining piece 12c.

Figure 4:
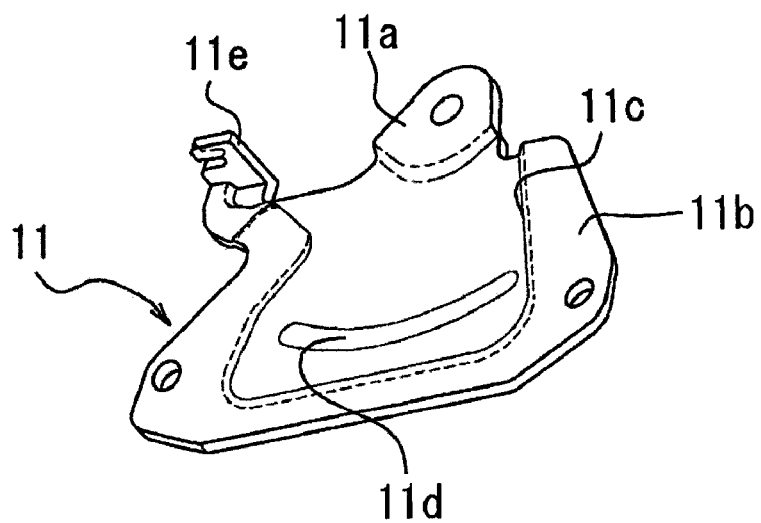
FIG. 4 is a schematic perspective view showing a support plate which is one of the components of the lock-release restricting means of FIG. 2.

Referring to FIG. 4, the support plate 11 includes a support portion 11a to which the arm body 12a is pivotally supported at the first end thereof via the support pin 13, an applying portion 11b which is applied onto the outer surface of the bottom portion of the corresponding lower rail member and fixedly attached to it, and a depression portion 11c depressed from the applying portion 11b. A bulged portion 11d of a substantially arc-shape is provided on an inner surface of the depression portion 11c. The second free end of the arm body 12a is slidably supported on the bulged portion 11d. The support plate 11 further includes a retaining piece 11e provided so as to project laterally and rise up from a region of the applying potion 11b which is projected laterally from the corresponding lower rail member as will be discussed hereinafter. The tension spring 14 is retained at the other end thereof to the retaining piece 11e of the support plate 11.

The lock-release restricting means which includes the support plate 11 and the restricting arm 12 is installed on the outer surface of the bottom portion of the lower rail members 3b in such a manner that the region of the applying portion 11b of the support plate 11 which includes the support portion 11a is projected laterally from the lower rail member 3b. With the arrangement of the support plate 11, a predetermined space is provided between the applying portion 11b of the support plate 11 and the outer surface of the bottom portion of the lower rail member 3b thanks to the present of the depression portion 11c. The space has a depth and a width which are enough to allow the pivotal movement of the arm body 12a.

The second free end of the arm body 12a is received in the space between the outer surface of the bottom portion of the lower rail member 3b and the applying portion 11b of the support plate 11 and extends toward the elongated hole 3c formed in the lower rail member. The first end of the arm body 12a is supported, via the support pin 13, to the support portion 11a of the support plate 11 which is projected laterally from the lower rail member 3b. The rising-up piece 12b of the restricting arm 12 is inserted through the elongated hole 3c of the lower rail member 3b and has the height reaching a position just under the rear end portion of the lock lever 10 when brought to the locked state with respect to the projecting teeth of a corresponding upper rail member.

Figure 5:
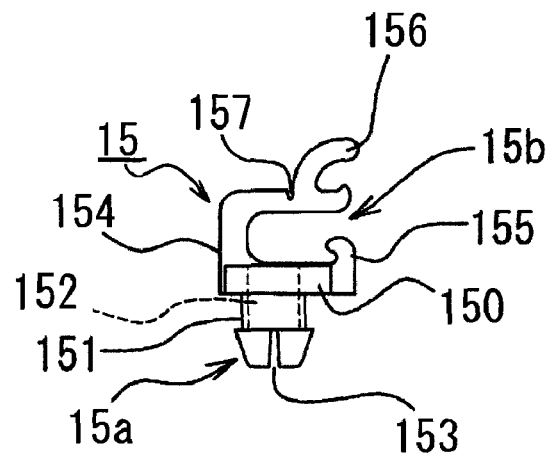
FIG. 5 is a schematic side view showing a fixing means for interconnecting an extension rod and the lock-release restricting means.

The extension rod 80 which extends from the striker lock 8 is connected to the retaining piece 12c of the restricting arm 12 through a resin-made fixing means 15 which is shown in FIG. 5. The fixing means 15 includes a clip portion 15a which is attached to the upper region of the retaining piece 12c of the arm body 12a, and a holder portion 15b for holding the extension rod 80 extending from the striker lock 8. The fixing means 15 is formed as a one-piece member comprising the clip portion 15a and the holder portion 15b.

The clip portion 15a has a disc-shaped flange portion 150 and a support post portion 151 inserted through a stopping hole which is formed in the upper region of the retaining piece 12c of the arm body 12a. A receiving hole 152 in which a bent end of the extension rod 80 is press-fitted is formed in the clip portion 15a so as to extend along a center of the support post portion 151 from the flange portion 150. An expanding slot 153 for facilitating the insertion of the support post portion 151 through the stopping hole of the retaining piece 12c is formed in a tip end region of the support post portion 151. The support post portion 151 of the clip portion 15a is movably inserted through the stopping hole of the retaining piece 12c so as to be movable according to the pivotal movement of the restricting arm which is brought about by a forward and rearward stroke of the extension rod 80.

Figure 6:
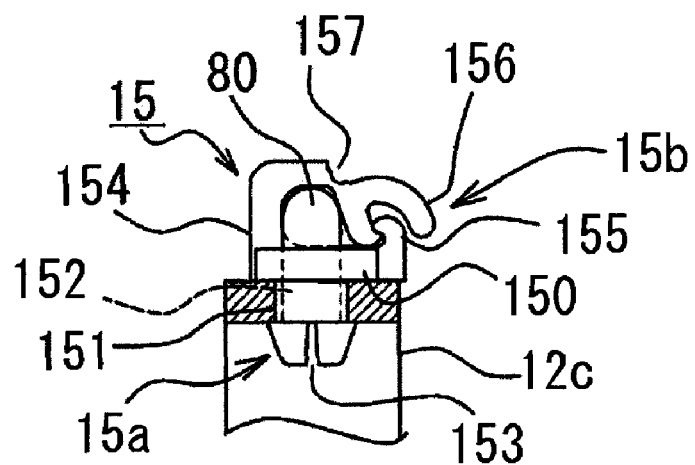
FIG. 6 is a schematic side view showing a state where the extension rod and the lock-release restricting means are connected to each other through the fixing means of FIG. 5.

The holder portion 15b has a substantially C-shaped holder body 154 whose lower region is integrated with a side region of the flange portion 150, a lower stopping claw 155 rising up from an end of the lower region of the substantially C-shaped holder body 154, an upper stopping claw 156 which is adapted to be holdingly engaged with the lower stopping claw 155, and a film hinge 157. The upper stopping claw 156 is connected through the film hinge 157 to the holder body 154 so as to be capable of being bent. Referring to FIG. 6, the extension rod 80 is connected to the fixing means 15 with an axial portion thereof being received in the substantially C-shaped holder body 154 and clamped by the lower and upper stopping claws 155, 156 which are engaged with each other, and with the bent end thereof being press-fitted in the receiving hole 152 of the fixing means 15.

Figure 7:
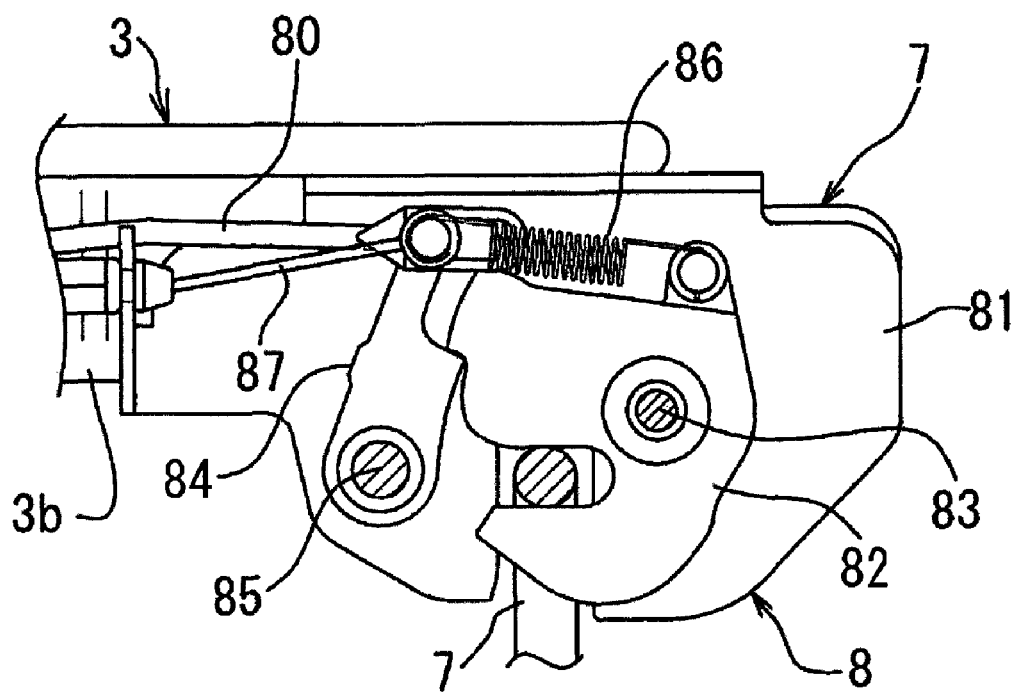
FIG. 7 is a schematic side view showing a striker lock in a state of being locked with respect to a striker.

Referring now to FIG. 7, the striker lock 8 includes a base frame 81 attached to a side surface of a rear end portion of the corresponding lower rail member 3b, a substantially hook-shaped latch 82 turnably supported to the base frame 81 by a support pin 83, and a substantially cam-shaped ratchet 84 swingably supported to the base frame 81 by a support pin 85. The latch 82 is releasably engaged with the ratchet 84. Moreover, the latch 82 is biased to a locked position and an unlocked position with respect to the ratchet 84 by a torsion coil spring (not shown) mounted around the support pin 83.

The extension rod 80 extends toward the lock-release restricting means from an upper end of the ratchet 84. The extension rod 80 is tension-supported by a coil spring 86 which is stretched between the upper end of the ratchet 84 and a rising-up piece rising up from a rear region of an upper surface of the latch 82. A traction cable 87 which extends from the traction strap 9 (see FIG. 11) is connected to the upper end portion of the ratchet 84.

As discussed above, the striker lock 8 is provided at each of the lower rail members 3b. Similarly, two spaced apart strikers 7 of substantially U-shapes are mounted on the automobile body floor with both ends thereof being fixed to the automobile body floor. The traction cable 87 extending from the traction strap 9 is branched into two sections on the way toward the striker locks 8.

In the slide/flip-up type automobile-seat which is constructed as discussed above, the lock-release restricting means are arranged such that the restricting arms 12 are pivotally supported to the support plates in such a manner that the rising-up pieces 12b of the restricting arms 12 can be moved between the positions just under the rear ends of the lock levers 10 and the positions just behind the rear ends of the lock levers 10 according to the forward and rearward stroke of the extension rods 80 which brings about unlocking and locking movements of the striker locks 8 with respect to the strikers 7.

The support plates 11 which serve as installation bases for the restricting arms 12 also serve as under covers for the restricting arms 12, so that even if any things (to be stored) such as baggage, luggage, etc. are placed in a space under the seat cushion, the restricting arms do not touch the things and, thus, the expected flipping-up movement of the entire seat can be performed.

Figure 8:
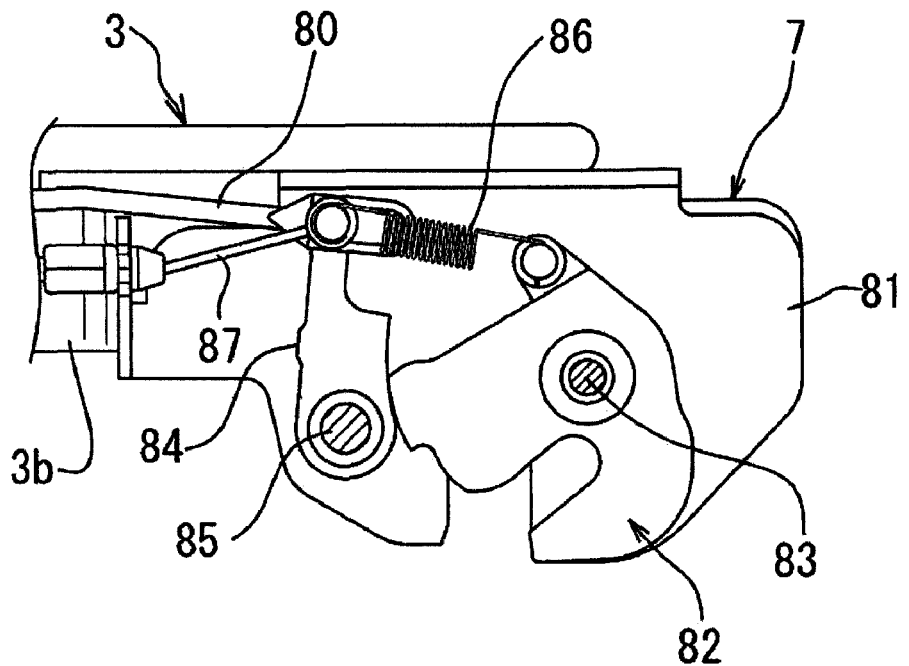
FIG. 8 is a schematic side view showing the striker lock in a state of being unlocked with respect to the striker.

In the illustrated automobile seat, when the lock levers 10 are unlocked by pulling the operation lever 4 up, the entire seat is brought to a state of being allowed to be slid along the lower rail members 3b and, when the operation lever 4 is released from the pulling-up, the lock levers 10 are locked. In the condition where the entire seat is moved rearward and the lock levers 10 are then locked, when the seat back is folded down onto the seat cushion and the strap 9 (see FIGS. 11 and 12) is then pulled to thereby draw the tension cable 87, the ratchets 84 are swung as shown in FIG. 8 (only one ratchet 84 is shown in FIG. 8) and the latches 82 are pivoted so as to be released from the engagement with the ratchets 84 and brought to states of being allowed to release the strikers 7 therefrom.

Figure 9:
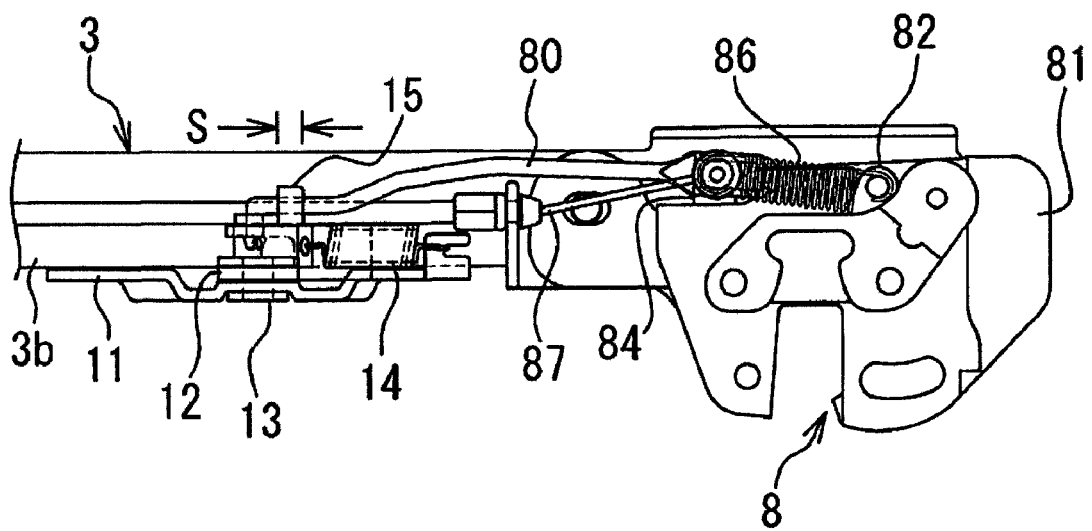
FIG. 9 is a schematic side view showing the lock-release restricting means of FIG. 1 and the striker lock in the unlocked state.
Figure 10:
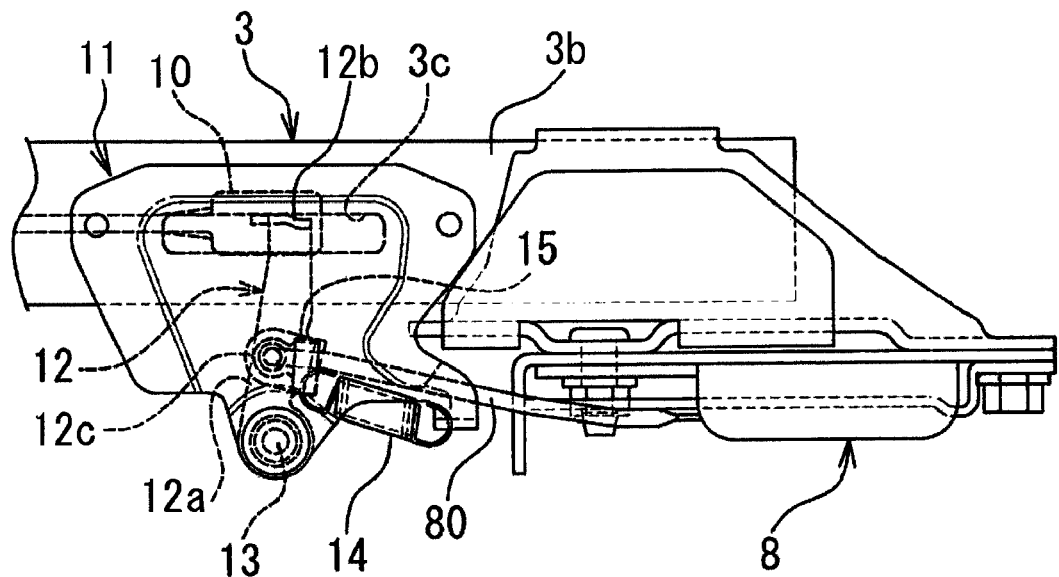
FIG. 10 is a bottom plan view showing the lock-release restricting means and the striker lock in the unlocked state.
Figure 12:
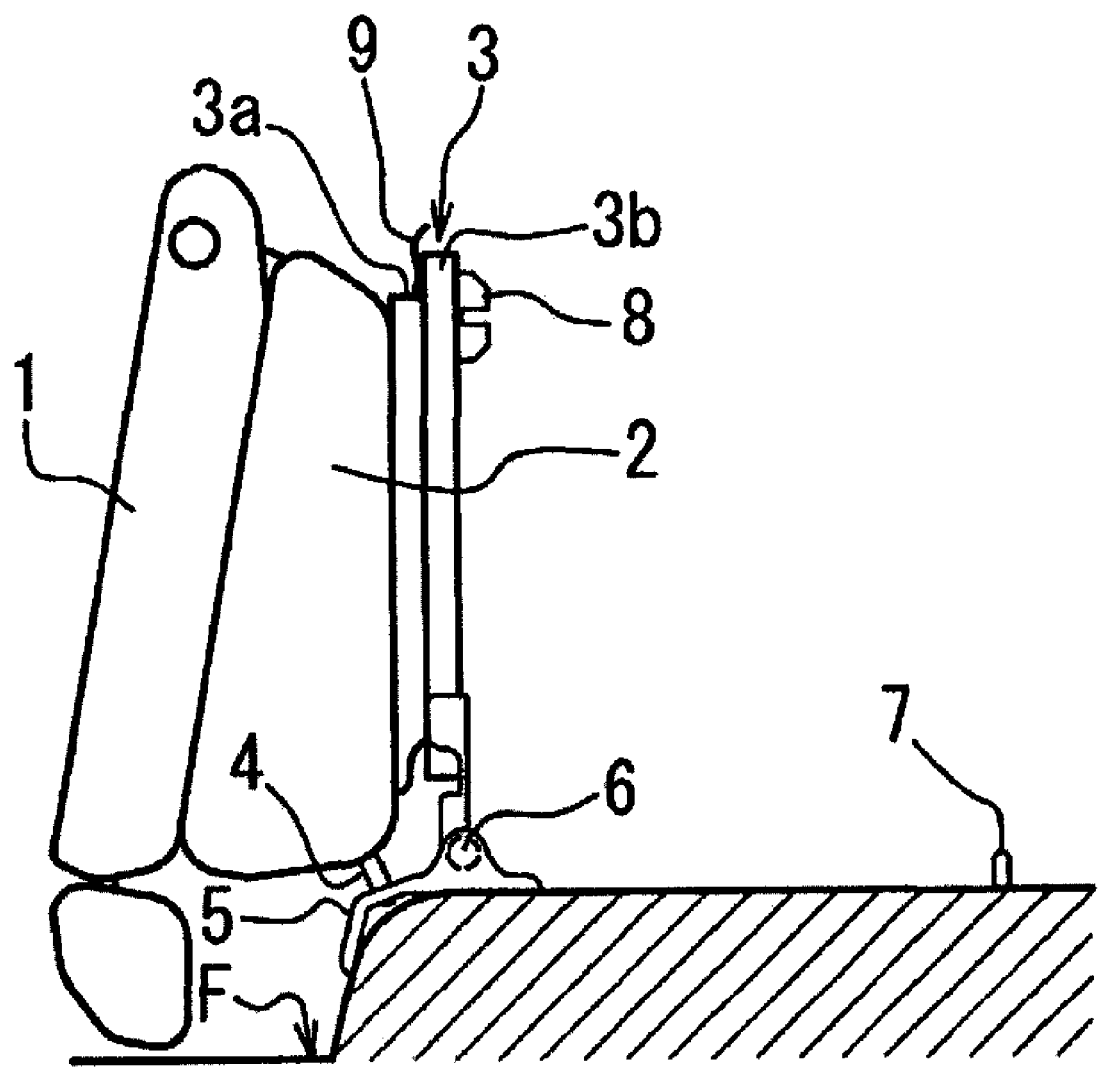
FIG. 12 is a schematic side view showing the automobile seat of FIG. 11 in a flipped-up state.

When the latches 82 are brought to the states of being allowed to release the strikers 7 therefrom, the entire seat is automatically flipped up from the rearward direction by the actions of the torque springs mounted around the support shafts 6 (see FIG. 12). As the ratchets 84 are swung by the drawing of the tension cable 87, the extension rods 80 are moved forward by a distance S as shown in FIG. 9, whereby the restricting arms 12 are pivoted in such a manner that the rising-up pieces 12b thereof are moved to the positions just under the rear end portions of the lock levers 10 in the locked states, and the lock levers 12b are restricted by the rising-up pieces 12b so as not to be pivoted downward.

Therefore, even if the person erroneously touches the operation lever 4 so as to pull the operation lever 4 up, the rear end portions of the lock levers 10 are abutted on the rising-up pieces 12b of the restricting arms 12, so that the rising-up pieces 12b of the restricting arms 12 restrict the lock levers 10 so as not to allow the lock levers 10 to be unlocked.

Incidentally, when the lock levers 10 are accidentally brought to states of being incompletely locked, the lock levers 10 become states where the rear end portions thereof are inclined in oblique downward directions, and the rising-up pieces 12b are abutted against rear end edges of the lock levers 10, so that the striker locks 8 are prevented from being unlocked. At this time, the person can recognize that the lock levers are in the incompletely locked states.

The terms and expressions which have been employed are used as terms of description and not of limitation, and there is no intention in the use of such terms and expressions of excluding any equivalents of the features shown and described, or portions thereof, but it is recognized that various modifications are possible within the scope of the invention claimed.

The invention claimed is:

1. A slide/flip-up type seat for an automobile, comprising:
   a seat cushion;
   a seat back pivotally supported to said seat cushion so as to be allowed to be folded down onto said seat cushion;
   a pair of spaced apart lower rail members pivotally supported, via support shafts, at forward end portions thereof to a pair of spaced apart brackets mounted on an automobile body floor;
   each of said lower rail members having an elongated hole formed in a bottom portion of a lower rail member so as to longitudinally extend;
   said lower rail members being provided at rearward end portions thereof with striker locks which are adapted to be releasably locked with strikers mounted on said automobile body floor;
   extension rods extending from said striker locks;
   a pair of spaced apart upper rail members attached to lower portions of said seat cushion and slidably supported to said lower rail members;
   a lock lever pivotally supported to each of said upper rail members and adapted to be locked with respect to said lower rail member to cause an upper rail member to be locked with respect to said lower rail member;
   an operation lever connected to said lock levers for actuating said lock levers in such a manner that said lock levers cause said upper rail member to be unlocked with respect to said lower rail members, so that an entire seat including said seat cushion and said seat back is allowed to be slid along said lower rail members;
   springs mounted around said support shafts for causing the entire seat including said seat cushion and said seat back in a state of being folded on said seat cushion, and said lower and upper rail members to be automatically flipped up about said support shafts from a rearward direction, together with said upper and lower rail members; and
   lock-release restricting means provided at each of said lower rail members for keeping said lock levers in unlockable states with respect to said lower rail members during flipping-up movement of said entire seat or in a state where said entire seat has been flipped up, and for keeping said striker locks in states of being unallowable to be unlocked when said lock levers are in states of incompletely locked with respect to said lower rail members;

said lock-release restricting means comprising:

a support plate attached to an outer surface of said bottom portion of said lower rail member so as to cover said elongated hole is formed, with a predetermined space being provided between said support plate and said outer surface of said bottom portion of said lower rail member and with a region of said support plate being projected laterally from said lower rail member; and a restricting arm including an arm body having first and second end portions, a rising-up piece rising up from said second end portion of said arm body and having a height reaching a position just under a rear end portion of said lock lever when brought to a locked state, and a retaining piece to which corresponding one of said extension rods is connected;

said restricting arm being arranged with said arm body being received in said space and pivotally supported at said first end portion thereof to said region of said support plate and with said rising-up piece being inserted through said elongated hole of said lower rail member and projected up to said position just under said rear end portion of said lock lever when brought to the locked state.

* * * * *